(No Model.) 2 Sheets—Sheet 1.
B. A. KAMP.
CORN SHELLER ATTACHMENT.
No. 557,585. Patented Apr. 7, 1896.
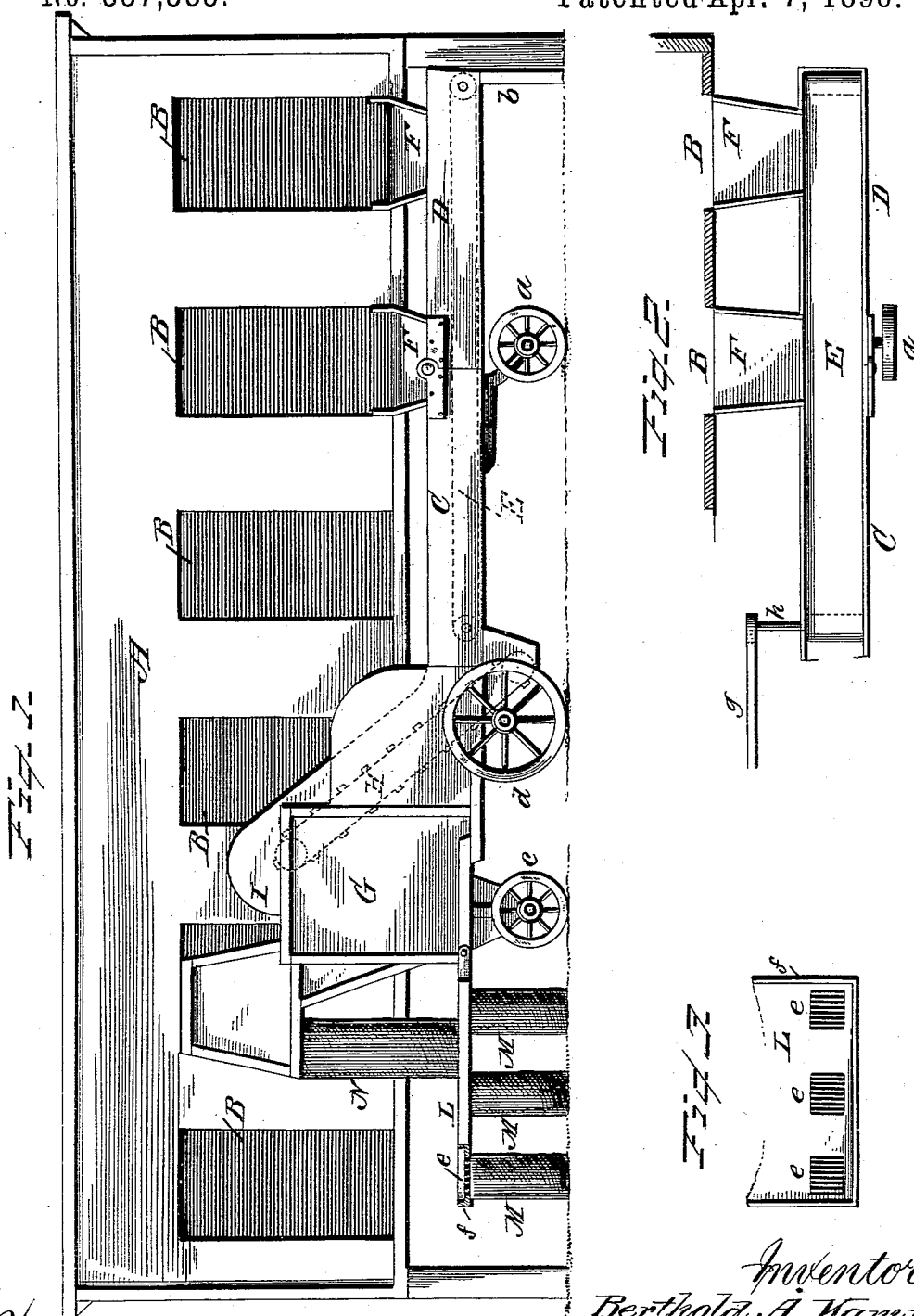
Witnesses
B. J. Williamson
G. N. Copenhaver
Inventor,
Berthold A. Kamp,
per Chas. N. Fowler
Attorney.

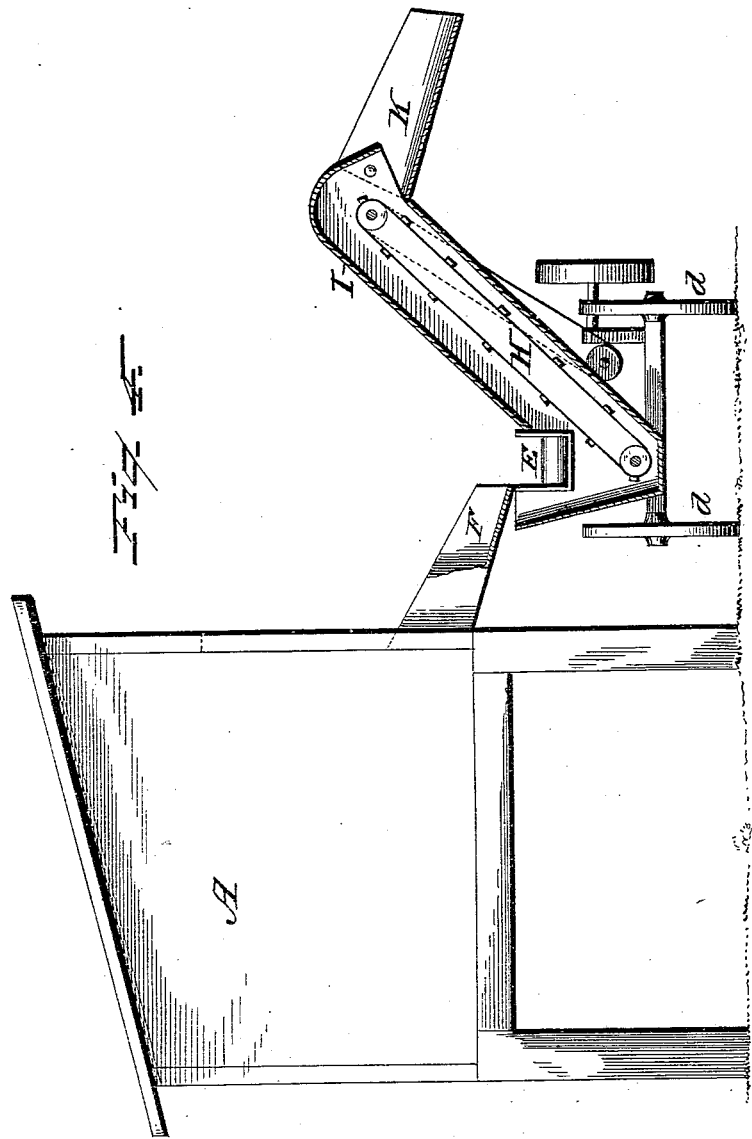

UNITED STATES PATENT OFFICE.

BERTHOLD A. KAMP, OF EVANSVILLE, INDIANA.

CORN-SHELLER ATTACHMENT.

SPECIFICATION forming part of Letters Patent No. 557,585, dated April 7, 1896.

Application filed October 19, 1895. Serial No. 566,277. (No model.)

*To all whom it may concern:*

Be it known that I, BERTHOLD A. KAMP, a citizen of the United States, residing at Evansville, in the county of Vanderburg and State of Indiana, have invented certain new and useful Improvements in Corn-Sheller Attachments; and I do hereby declare that the following is a full, clear, and exact description of the same, reference being had to the annexed drawings, making a part of this specification, and to the letters of reference marked thereon.

The present invention has for its object to improve the means now employed for shelling, handling, and sacking corn, whereby the method is materially facilitated in taking the corn from the corn-bins and carrying it by suitable devices to the sheller, and afterward taking the shelled corn and bagging it, as will be hereinafter described and claimed.

Figure 1 of the drawings represents a side elevation of the several attachments and the corn bin or bins connecting therewith; Fig. 2, a top plan view of the endless carrier and the chutes connecting with the openings in the corn-bins; Fig. 3, a detail plan view of the support for the bags, showing the grated bottoms for the delivery of the waste corn to the bags; Fig. 4, an end view of the corn bin or bins, showing the attachments thereto partly in section.

In the accompanying drawings, A represents the usual corn bin or bins, which are provided with the openings B for removing the corn therefrom.

Previous to my invention it was the usual custom to remove the shelling-machine from one opening in the bin to the next opening in order to have the machine in convenient proximity thereto to facilitate the removal of the corn and feeding it to the shelling-machine, also in preventing any waste of the corn in bagging, which my invention provides against.

The most practical means at present devised in carrying out my invention may be understood from the following description:

A suitable frame is provided, which frame is constructed in two sections C D, the former section being stationary and supported by a wheel or wheels $a$, and the latter section hinged to said stationary section in any convenient and well-known manner. The hinging of the section D of the frame to the section C admits of the hinged section to be swung over and upon the stationary section to fold the two together when the frame is not required for use and facilitate its transportation and also the economy of space. The section D at its outer end has a suitable support $b$ to sustain the section in a horizontal position when in use. The frame, constructed of the two sections C D, contains an endless carrier E, of any well-known construction, and suitable chutes F are provided to connect the openings B of the corn-bin with the frame and endless carrier.

The corn-sheller will assume the position shown at G, and as any of the ordinary corn-shellers may be used it is not deemed necessary to show in detail its construction, as no claim is made to any special form of sheller.

The sheller has connected therewith a suitable elevator H, which elevator connects in any suitable manner with the endless carrier E, whereby the corn from the carrier may be taken up by the elevator and delivered to the sheller. The elevator has the usual casing I, and to deliver the corn from the elevator into the sheller a suitable chute K is provided, which is located between the casing and sheller to form a communication between the two. The casing I at its upper end has an opening, at which end the chute K is pivoted, so that it can be folded over upon the casing when not required for use.

The frame of the corn-sheller and the casing of the elevator are supported on wheels $c\ d$, respectively, to facilitate their removal.

The corn-sheller is preferably independent of the elevator, so that it may be moved separately, although a frame may be provided especially adapted to carry the corn-sheller and elevator as a fixed connection thereto, as found most desirable, such changes being obvious and may be made without departing from the principle of the invention.

Connected to the frame of the corn-sheller or to any other stationary object is a folding supporting-platform L, which has around its sides an upwardly-projecting flange $f$ to prevent the shelled corn from passing over the sides of the platform onto the ground. The platform L has a perforated or grated bottom $e$, through which the shelled corn which drops onto the platform may pass into the bags M upon the under side of said platform.

The corn as it passes from the sheller may be delivered to the bag N in any well-known and convenient manner, either by a chute, an endless belt or carrier, or by any other means found best adapted to the purpose.

When not in use, the supporting-platform L may be swung up against the frame of the corn-sheller out of the way, its pivotal connection with the frame admitting of its being folded against the frame. Motion may be given to the endless carrier E and the elevator H by suitable belts and pulleys in the usual manner, a belt $g$ connecting with a pulley on a shaft $h$, which rotation of the shaft will operate the belt and said belt in turn connecting with the belts and pulleys which operate the elevator H.

As the means employed for imparting motion to the endless carrier and the elevator are of the ordinary and usual construction, such as belts and pulleys, or an arrangement of gearing as found most desirable, and as any special construction thereof would form no part of the invention, it is not considered necessary to a proper understanding of the construction and operation of the parts to show in detail the driving power further than what is illustrated in the drawings.

In filling the bag N any waste of the shelled corn or the corn that does not enter the bag will fall on the supporting-platform L and can then be swept into the bags M, the waste corn passing through the openings in the grated opening $e$, thereby preventing the waste of any corn which would otherwise fall upon the ground, were it not for the flanged supporting-platform L with its perforated or grated bottoms $e$.

With the arrangements of devices herein described it will be readily seen the advantages secured and the time saved in taking the corn direct from the bin, passing it on and delivering it to the sheller and from the sheller to the bag without moving or changing the position of the devices, as heretofore, the corn being shelled and bagged with great rapidity with the economy of both time and labor.

Having now fully described my invention, what I claim as new, and desire to secure by Letters Patent, is—

1. A corn-sheller, having connected thereto a conveyer-frame in which is placed a conveyer to receive the corn from the bins, combined with an elevator for raising the corn to the sheller, a chute for delivering the corn from the elevator to the sheller; and a perforated platform through which the corn is delivered to the bags; the feeding and bagging devices being mounted upon the sheller-frame and forming a structural portion thereof, substantially as shown.

2. A corn-sheller, having a jointed conveyer for receiving the corn from the bins, and an elevator for raising the corn from the conveyer to the sheller located upon one side thereof, combined with a pivoted and perforated platform placed upon the other side thereof, the conveyer, elevator and platform being connected to the sheller-frame so as to form a structural part thereof, and extending in a straight line so as to receive the corn from a number of bins or a number of places from the same bin, substantially as described.

In testimony that I claim the above I have hereunto subscribed my name in the presence of two witnesses.

BERTHOLD A. KAMP.

Witnesses:
JOHN W. KRATZ,
WILLIAM KRATZ.